(12) United States Patent
Squire et al.

(10) Patent No.: US 7,702,732 B1
(45) Date of Patent: Apr. 20, 2010

(54) METHODS FOR AUTO-CONFIGURING A ROUTER ON AN IP SUBNET

(75) Inventors: Matthew B. Squire, Raleigh, NC (US); Kedarnath Poduri, Santa Clara, CA (US); Haldon J. Sandick, Durham, NC (US)

(73) Assignee: Nortel Networks Limited, St. Laurent, Quebec (CA)

( * ) Notice: Subject to any disclaimer, the term of this patent is extended or adjusted under 35 U.S.C. 154(b) by 1515 days.

(21) Appl. No.: 09/407,915

(22) Filed: Sep. 29, 1999

(51) Int. Cl.
*G06F 15/16* (2006.01)
(52) U.S. Cl. .................. 709/206; 709/218; 709/219; 709/228; 709/229
(58) Field of Classification Search ............ 709/220, 709/219, 228, 227, 302, 218, 229; 710/302; 707/506; 370/218
See application file for complete search history.

(56) References Cited

U.S. PATENT DOCUMENTS

| | | | | |
|---|---|---|---|---|
| 5,557,748 A | | 9/1996 | Norris ................. 395/200.1 |
| 5,708,778 A | * | 1/1998 | Monot .................... 709/228 |
| 5,717,853 A | | 2/1998 | Deshpande et al. ...... 395/200.1 |
| 5,724,510 A | | 3/1998 | Arndt et al. |
| 5,838,907 A | * | 11/1998 | Hansen ................... 709/220 |
| 5,913,921 A | | 6/1999 | Tosey et al. ........... 395/200.5 |
| 5,940,376 A | | 8/1999 | Yanacek et al. ........... 370/250 |
| 5,963,540 A | * | 10/1999 | Bhaskaran .............. 370/218 |
| 5,968,126 A | * | 10/1999 | Ekstrom et al. ........... 709/225 |
| 5,999,948 A | * | 12/1999 | Nelson et al. ............ 707/506 |
| 6,012,088 A | * | 1/2000 | Li et al. ................. 709/219 |
| 6,047,325 A | * | 4/2000 | Jain et al. ............... 709/227 |
| 6,070,187 A | | 5/2000 | Subramaniam et al. ..... 709/220 |
| 6,091,732 A | | 7/2000 | Alexander, Jr. et al. ..... 370/401 |
| 6,098,097 A | * | 8/2000 | Dean et al. ............... 709/220 |
| 6,115,385 A | | 9/2000 | Vig |
| 6,141,738 A | | 10/2000 | Munter et al. |
| 6,175,865 B1 | * | 1/2001 | Dove et al. ............... 709/220 |
| 6,256,314 B1 | | 7/2001 | Rodrig et al. ............. 370/401 |
| 6,263,387 B1 | * | 7/2001 | Chrabaszcz .............. 710/302 |
| 6,282,201 B1 | | 8/2001 | Alexander, Jr. et al. ..... 370/401 |
| 6,286,038 B1 | * | 9/2001 | Reichmeyer et al. ........ 709/220 |
| 6,345,294 B1 | * | 2/2002 | O'Toole et al. ............ 709/222 |
| 6,425,003 B1 | | 7/2002 | Herzog et al. |
| 6,507,863 B2 | | 1/2003 | Novaes |
| 6,532,217 B1 | | 3/2003 | Alkhatib et al. |
| 6,697,360 B1 | * | 2/2004 | Gai et al. ................. 370/389 |

OTHER PUBLICATIONS http://www.faqs.org/rfcs/ Network Working Group RFC# 1583, J. Moy, Mar. 1994 pp. 1-156.*
http://www.faqs.org/rfcs/ Network Working Group RFC# 2453, G. Malkin, Nov. 1998 pp. 1-30.*
http://www.faqs.org/rfcs/ Network Working group RFC# 2338, S.Knight, Apr. 1998, pp. 1-22.*

(Continued)

*Primary Examiner*—Vivek Srivastava
*Assistant Examiner*—Adnan Mirza

(57) ABSTRACT

An autoconfiguring data router is connected to a communications network subnet having a second network data router. The autoconfiguring data router includes a configuration determination module that determines configuration attributes for operably connecting the autoconfiguring data router to the subnet, and an autoconfiguration module that configures the autoconfiguring data router according to the configuration attributes so that the autoconfiguring data router is operably connected to the subnet.

58 Claims, 2 Drawing Sheets

OTHER PUBLICATIONS http://www.faqs.org/rfcs/ Network Working Group RFC# 1240, C. Shue, Jun. 1991 pp. 1-7.* http://www.faqs.org/rfcs/ Network Working group RFC# 1885, S.Deering, Dec. 1995, pp. 1-13.*

"TCP/IP Illustrated", vol. I, The Protocols, W. Richard Stevens, 1994, pp. 62-63.

"ICMP Router Discovery Messages," Network Working Group, S. Deering, Sep. 1991.

Haritsa, J. R., et al.: "Mandate: Managing Networks Using Database Technology": XP000491494; IEEE Journal on Selected Areas in Communications; IEEE Inc.: New York, US.; vol. 11, NR. 9: pp. 1360-1372.

Fuller, V., et al.: "Classless Inter-Domain Routing (CIDR): An Address Assignment and Aggregation Strategy"; ftp://ftp.isi.edu/in-notes/rfc1519: Network Working Group: p. 1.

htttp://www.faqs.org/rfcs/ Network Working Group RFC#2338, S. Knight, Apr. 1998, pp. 1-22.

http://www.faqs.org/rfcs/ Network Working group RFC # 1240, C. Shue, Jun. 1991 pp. 1-7.

http://www.faqs.org/rfcs/ Network Working group RFC# 1885, S. Deering, Dec. 1995, pp. 1-13.

Office Action dated Nov. 19, 2004 in connection with U.S. Appl. No. 09/408,386.

Office Action dated Apr. 19, 2004 in connection with U.S. Appl. No. 09/408,386.

Office Action dated Jan. 2, 2004 in connection with U.S. Appl. No. 09/408,386.

Office Action dated Aug. 14, 2003 in connection with U.S. Appl. No. 09/408,386.

Office Action dated Mar. 20, 2003 in connection with U.S. Appl. No. 09/408,386.

Office Action dated Jan. 29, 2003 in connection with U.S. Appl. No. 09/408,380.

Office Action dated Jul. 5, 2002 in connection with U.S. Appl. No. 09/408,380.

* cited by examiner

METHODS FOR AUTO-CONFIGURING A ROUTER ON AN IP SUBNET

CROSS REFERENCE TO RELATED APPLICATIONS

This patent application is related to the following commonly-owned United States patent applications which are hereby incorporated herein by reference in their entireties:

U.S. patent application entitled "SYSTEM, DEVICE, AND METHOD FOR DETERMINING A NETWORK ADDRESS AND SUBNET MASK FOR A NETWORK DEVICE IN A COMMUNICATION NETWORK", filed on even date herewith and identified by Ser. No. 09/408,386; and U.S. patent application entitled "APPARATUS AND METHOD OF CONFIGURING A NETWORK DEVICE", filed on even date herewith and identified by Ser. No. 09/408, 380.

TECHNICAL FIELD

The present invention relates generally to communications networks, and more specifically, to network data routers in such networks.

BACKGROUND ART

Configuring network devices is a significant burden for computer administrative staffs. As individual networks grow, the complexity of their configuration and management increases. Moreover, with the addition of new networks, new protocols, and new services, the already difficult task of configuring and managing a network can become overwhelming.

The difficulties of network management arise from many sources. First, configuring a network device is a labor intensive process that requires special training. Current configuration methods require an administrator to initiate and perform the actual configuration before the network device can become a functional part of the network. In addition, when a network device must be reconfigured due to network growth or change, an administrator again must be personally involved to execute the reconfiguration process.

Second, configuration is more complicated in the current multi-vendor network environment where there is no single standard configuration method for every network device. There are many possible ways to configure network devices, such as by using SNMP, command line interfaces, and configuration files using FTP. In fact, the preferred method of configuring a single type of network device frequently varies from vendor to vendor. Recently, this problem has become worse with an increased number of acquisitions in the network industry. An acquired company's products often are configured differently than its acquiring company's existing products. Thus, even within a single vendor's product line, it often is necessary to support multiple configuration methods.

Finally, configuring a network device is error-prone and the process is difficult to debug. While some configuration tools are beginning to become available, most currently available tools do little or no semantic and/or consistency checking between related configuration options.

SUMMARY OF THE INVENTION

A preferred embodiment of the present invention provides a method of configuring a first network device for connection to a communications network subnet having a second network device. The method includes determining, with a configuration determination module of the first network device, configuration attributes for operably connecting the first network device to the subnet, and configuring the first network device, with an autoconfiguration module of the first network device, according to the configuration attributes so that the first network device is operably connected to the subnet.

Another preferred embodiment includes an autoconfiguring data router connected to a communications network subnet having a second network data router. The autoconfiguring data router includes a configuration determination module that determines configuration attributes for operably connecting the autoconfiguring data router to the subnet, and an autoconfiguration module that configures the autoconfiguring data router according to the configuration attributes so that the autoconfiguring data router is operably connected to the subnet.

In either of the above embodiments, configuring the first network device may be performed automatically by the autoconfiguration module. Alternatively, configuring the first network device may be performed as a guided process in which the autoconfiguration module interacts with a user and presents to the user suggested configuration choices based on the configuration attributes. The suggested configuration choices may be accompanied by an explanation to the user as to why the configuration choices have been suggested.

The network attributes may include IP subnet mask, Dynamic Host Configuration Protocol (DHCP) forwarding data, DHCP server address, virtual local area network (VLAN) information including tag identifications, types, protocols, addresses, and port to VLAN mappings, Spanning Tree Group information, Simple Network Management Protocol (SNMP) server addresses, Open Shortest Path First (OSPF) timer information, Routing Information Protocol (RIP) broadcast timer information, and/or Virtual Router Redundancy Protocol (VRRP) information.

In a further embodiment, the configuration determination module communicates with a network centralized configuration server, for example using Simple Network Management Protocol (SNMP), to determine the configuration attributes, and receives relevant configuration attributes from the centralized configuration server. Alternatively, or in addition, the configuration determination module may communicate with a second network data router to determine the configuration attributes. In such an embodiment, the configuration determination module may use a protocol based on Internet Control Message Protocol (ICMP) or User Datagram Protocol (UDP) to communicate with the second network data router. In another alternative or additional embodiment, the configuration determination module may analyze routing protocol control packets detected by the autoconfiguring data router to determine by itself the configuration attributes.

A further embodiment also includes a computer network having at least one subnetwork, the at least one subnetwork having a plurality of data routers that communicate data packets over the network, the subnetwork including at least one autoconfiguring data router according to one of the above embodiments. An embodiment also includes a computer program product for use on a computer system for configuring a first network device for connection to a communications network subnet having a second network device, the computer program product comprising a computer-usable medium having computer-readable program code thereon for performing a method of autoconfiguring a first network device according to one of the above embodiments.

BRIEF DESCRIPTION OF THE DRAWINGS

The present invention will be more readily understood by reference to the following detailed description taken with the accompanying drawings, in which.

DETAILED DESCRIPTION OF SPECIFIC EMBODIMENTS

A preferred embodiment includes a network data router that assembles its own configuration information without having a network administrator or an operator involved or acting as the primary source of configuration data. This capability does not configure policy specific information, but it does allow a router to establish basic IP connectivity in the network so that the router automatically forwards IP datagrams, participates in routing protocols, and enables other protocols such as DHCP and VRRP.

When configuring a router, some configuration attributes are unique to the device being configured, while other attributes are characteristic of a set of devices. For example, an IP or MAC address is unique to a particular router, but a subnet mask or an OSPF area is a trait of many routers. In the prior art, both types of configuration attributes are entered by an administrator for each individual router in the configuration domain. For information that is characteristic of a set of devices, an administrator must enter the same information at each device. However, much of this information may be obtained by observing the control traffic on neighboring network devices. Additional configuration information may also be obtained through direct and automatic communication with neighbor routers, and, if present in the network, a centralized management systems (CMS). The collection and intelligent utilization of this information forms the basis of preferred embodiments of the present invention.

Figure 1:
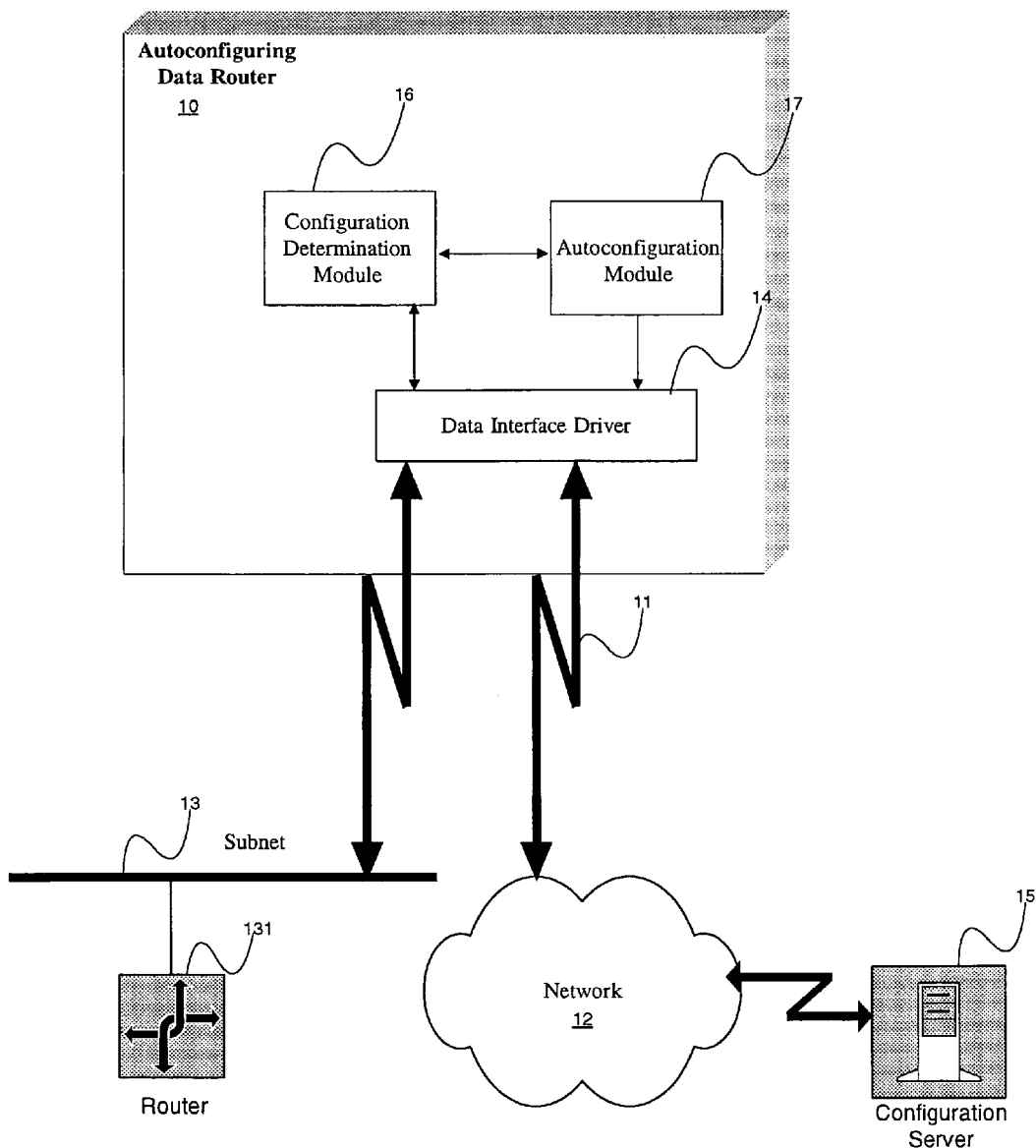
FIG. 1 is a logical block diagram of a system according to a preferred embodiment.
Figure 2:
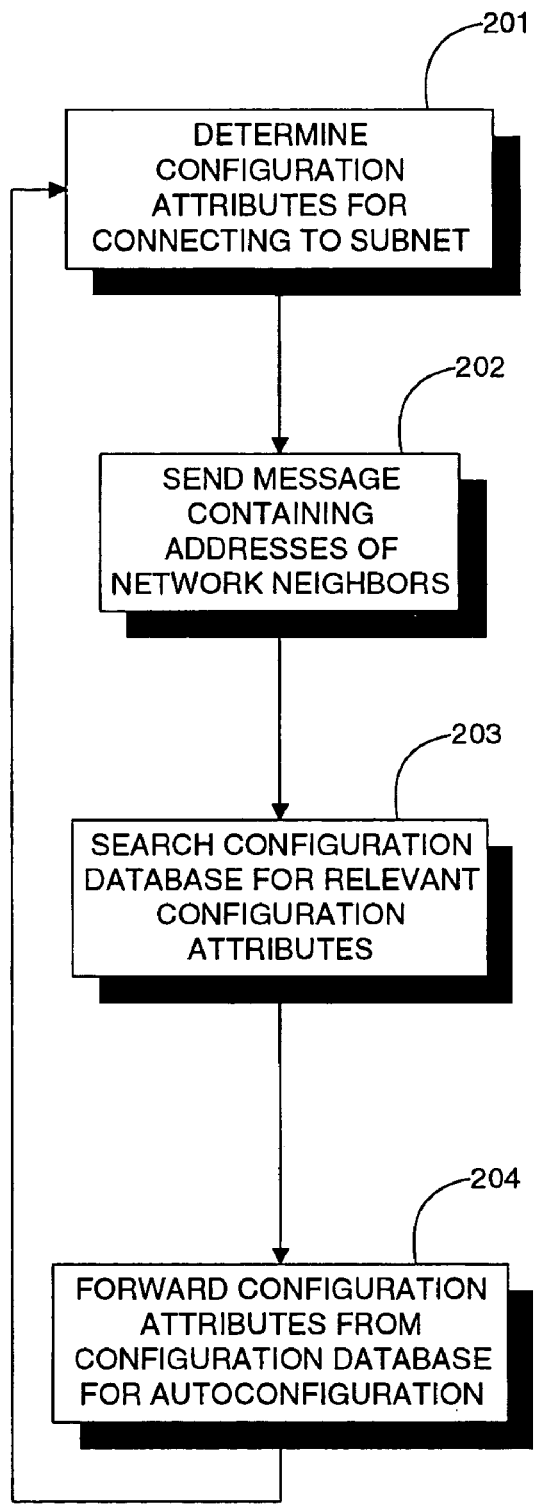
FIG. 2 illustrates the logical steps of a method of a preferred embodiment.

FIG. 1 is a logical block diagram of a system according to a preferred embodiment, and FIG. 2 illustrates the logical steps of a method of a preferred embodiment. FIG. 1 shows an autoconfiguring data router 10 according to a preferred embodiment. A data interface driver 14 within the router 10 communicates via one or more links 11 to a network 12 having any generic structure. Within the larger network 12, the autoconfiguring data router 10 is in the topological vicinity and a logical part of a subnet 13 having one more other attached devices, for example another router 131.

A configuration determination module 16 within the autoconfiguring data router 10 determines configuration attributes for operably connecting the autoconfiguring data router 10 to the subnet 13, step 201 of FIG. 2. An autoconfiguration module 17 configures the router 10 according to the configuration attributes determined by the configuration determination module 16 so that the router 10 is operably connected to the subnet 13, and thereby, to the larger network as a whole 12.

In one embodiment, the configuration determination module 16 sends a message containing addresses of network neighbors to a configuration server 15 connected to the network 12, step 202 of FIG. 2. The configuration server 15 searches a configuration database to determine relevant configuration attributes for the autoconfiguring router 10, step 203, and forwards the attributes to the router for autoconfiguration, step 204. As shown in FIG. 2, this process may be ongoing during normal network operations such that once step 204 is completed, the process loops back to the beginning and starts over.

In an alternative embodiment, autoconfiguration may be based on having the configuration determination module 16 communicate with another router such as router 131 on the subnet 13 which then returns relevant configuration attributes to the router 10 for autoconfiguration. This communication may be an active two-way exchange between the configuration determination module 16 and the other router 131, or the other router 131 may simply periodically advertise subnet configuration attributes using, for example, ICMP Router Advertisements (RAs), which the configuration determination module 16 receives and processes. In another alternative embodiment, the configuration determination module 16 determines necessary configuration attributes by itself, without the assistance of any outside devices, by monitoring and analyzing routing protocol packets of neighboring devices as detected by the data interface driver 14.

The auto-configuration process in a preferred embodiment can be thought of as performing three inter-related operations. The first operation gathers information about the attached network(s) by passively listening to, or "snooping," router control traffic present on attached interfaces. This information is used to assemble configuration information unique to each attached subnet. In addition, the information is used to determine the IP subnet mask and then, based on the mask, to select an address for the interface. The second operation is to acquire additional configuration information through direct communication with a Centralized Management System (CMS) and/or other routers. The third operation then is to take the configuration information collected or generated by the first two operations, and apply it to create the router's configuration. It is important to note that the first two operations may run continuously, so the acquisition of network configuration information never stops. This permits the utilization of the collected data to occur at any time. The details of these operations follow in the next three sections. A preferred embodiment of the present invention may be implemented, for instance, in a layer 3 enterprise switch such as in the Accelar product line marketed by Nortel Networks.

The first auto-configuration operation—passive collection and utilization—enables a router to collect information about the IP subnets to which it is directly attached. Routing and switching devices on a particular interface are detected by passively listening to control traffic such as routing protocols and spanning tree messages. Such traffic is easy to identify and snoop because each protocol uses a broadcast or multicast and either a well known multicast address or a well known TCP/UDP port. By looking at the source address in these control traffic packets, a router can assemble the set of active network devices active on each interface.

For example, assume Device A is connected to Device B. If B is a router, then it is probably sending out RIP advertisements or OSPF hello messages periodically. If B is a switch or bridge, then it is sending out spanning tree BPDUs periodically. Since A and B are connected, A will receive these packets and can process them in order to learn something about the configuration of B. The main issues with passive learning are which packets should be snooped and what information can be learned from them.

Deciding which packets to snoop depends on the capabilities of the Autoconfig device. If the device is capable of running RIP, then it should snoop RIP packets. If the device is capable of running OSPF, then it should snoop OSPF packets.

In general, if a preferred embodiment might have to configure a protocol on a device, it should snoop packets of that protocol.

The information that can be learned from each packet depends on the protocol. The following protocols may be configured with Autoconfig, and with each protocol is listed the information that is learned from the packets of that protocol. Note that this list is not intended to be complete, only indicative of the passive learning process.

- Spanning Tree Protocol (STP)—Learns STP is enabled, 802.1D VLAN information, and the source MAC address (used for Multi Link Trunking configuration).
- Routing Information Protocol (RIP)—Learns RIP is enabled.
- Open Shortest Path First (OSPF)—Learns OSPF is enabled, the subnet mask, the OSPF hello timer, and the OSPF router dead timer.
- Virtual Router Redundancy Protocol (VRRP)—Learns VRRP is enabled, the VR identifier, the VR IP address, the priority of other routers, and the advertisement interval.
- Dynamic Host Configuration Protocol (DHCP)—The server address(es) and the mode of BOOTP/DHCP being used on each interface is determined.
- Topology Discovery Protocol (TDP)—Learns adjacent IP addresses.

In some cases, e.g. OSPF, using information contained in the control packets may only involve copying the information. However in other cases, the information from several control packets must be correlated in order to use the information successfully, e.g. determining which trunks are part of the same Multi Link Trunking (MLT) group.

While the information assembled during this first operation is extremely useful, it only allows the router to configure itself in relatively simple network environments. Most environments, however, require configuration data that cannot be obtained through passive listening. The second auto-configuration operation involves explicit communications with another device that can provide additional configuration details. These additional configuration details may be used to augment and adjust the information collected by passive listening.

The router may obtain such information either directly from another router or by contacting a network centralized configuration server known as a Central Management System (CMS).

For example, network configured routers contain configuration information that is common to all routers on the same subnet, which is, therefore, useful to a new router in the process of configuring itself. Extensions to the Internet Control Message Protocol (ICMP) router discovery protocol may be used to carry such data. The configuration information advertised includes, but is not limited too:

Virtual Local Area Network (VLAN) identifiers
 SNMP Transport Gateway (STG) identifiers
 VLAN/STG associations
 VLAN types
 Subnet Mask
 Static default route
 Dynamic Host Configuration Protocol (DHCP) server
 DHCP Relay mode Alternatively or in addition, if configuration information is managed or present on a CMS, it is possible for a new router to obtain configuration information from the CMS without having the operator manually predefine the information for that router. The router sends the CMS a message containing the addresses of the network neighbors that are active on subnet, as determined by passive snooping. The address of the CMS may be system defined, well-known, or available from some service mechanism (e.g. Service Location Protocol, DHCP, or others).

After the CMS receives the router's request message, it searches for each of the neighboring device addresses in its configuration database. If it finds the neighbor address, it then assembles all the information that is relevant to the requesting router. The CMS server then forwards the information back to the device using Simple Network Management Protocol (SNMP). An Autoconfig Management Information Base (MIB) has been defined for this purpose. A configuration source can use SNMP to set variables in this MIB corresponding to the configuration of other devices. The Autoconfig device then utilizes this information to make intelligent configuration choices. If the source is another Autoconfig device, then the source can detect a network device via BPDU, RIP, OSPF, etc., and test to see if the new device supports the Autoconfig MIB. If the discovered device supports the Autoconfig MIB, then the source can send the relevant configuration data to the newly detected Autoconfig device.

Since SNMP was chosen as the protocol for sending configuration data, a working IP stack is a prerequisite of Autoconfig. In other words, before running Autoconfig, one must have an IP address. Although not ideal, the use of the boot monitor to set a management address on a new device is not uncommon, and this feature may be used to get the initial IP address of the Autoconfig device. Alternatively, the IP address could be system defined, or the configuration determination module may be capable of determining the IP address itself.

Thus, one embodiment of Autoconfig makes two initial assumptions about information already being configured: (1) that the Autoconfig device has an IP address, and (2) if it is to communicate with a network management station, the address of this station is known. These parameters could be set via the CLI. However, an alternative embodiment employs a better solution, namely, to have the Autoconfig device incorporate a Dynamic Host Configuration Protocol (DHCP) client to obtain its initial address, and include an extension in the DHCP responses indicating the management station. With this solution, no configuration is required at the Autoconfig device. Another possible method for contacting a management station is to use a well-known or system defined address for the management station which may be a Service Location Protocol (SLP) server which in turn provides Autoconfig with an IP address.

SNMP is a good choice for a protocol between a client and server, but is not an optimal choice between clients. For this reason, one embodiment uses a different method for client-to-client communication. ICMP Router Advertisements (RAs) are used by routers to inform other devices of their existence and potential use as gateways. Extensions are included within the ICMP RAs to advertise information in addition to the IP address. Autoconfig devices periodically transmit ICMP RAs with these extensions to all routers over each routable interface. Other Autoconfig devices can then receive these messages and incorporate the information into their database.

The third operation of a preferred embodiment involves the instantiation of the router's configuration. From the configuration information determined by the first two operations, the router forms a set of suggested configuration parameters for an interface. Then, this set of suggested parameters is applied to the router which is actually configured.

One of the primary actions required when configuring a router is the selection of the IP address and mask. To determine the IP subnet mask, an advanced heuristic algorithm leverages the common numbering practice for routers. After determining the subnet mask, the router moves on to selecting an IP address suitable for the subnet. A preferred embodiment confirms its choice by sending a Gratuitous Address Resolution Protocol (GARP) message for the address on the subnet. If the router receives no reply, then the router assumes that no other device on the subnet is using that address, and it can claim the address for itself. If the router receives a reply and the address is not available, the router tries again with a new address.

There are two options when applying the assembled configuration information to the local router device. The first option is a fully automated procedure where the auto-configuration process uses the collected information to configure the router without administrative intervention. This involves inspecting the collected configuration data, forming a candidate configuration, and creating the configuration via internal function calls. The auto-configuration process is then finished, and the router becomes a functional part of the network.

However, since a fully self-configuring device will not be trusted in many network environments (at least initially), a second option is provided. In the second option, a network administrator uses the router's command line interface (CLI) to review the configuration parameter values selected by the auto-configuration process in the first two operations. The administrator is then walked through these choices using a "guided configuration." The choices are presented sequentially, and supply the administrator with intelligent default values that are chosen based on information assembled earlier, e.g. IP subnet mask. The administrator then can accept or change the default values as desired. Accepting the suggested configuration parameter requires only hitting the 'enter' key. When the guided configuration completes, the information is mapped into the appropriate internal configuration function calls. The router then becomes a functional part of the network.

Guided configuration differs from typical CLI configuration in several ways. First, when using a prior art CLI, parameters are usually set one at a time. Second, CLIs require users to navigate a directory based menu structure in order to set each item. In addition, the user must configure these parameters in the correct order and have a priori knowledge of the required order, e.g. an IP interface must be defined on a port before configuring OSPF on that port. Third, the CLI requires the user to supply network specific information without offering defaults, e.g. IP address, IP subnet, default router, etc. Thus, guided configuration permits a user to configure many basic functions while avoiding the drawbacks of a normal CLI.

An implicit assumption in preferred embodiments, is that a device should be configured "like" those devices to which it is connected. For example, if Device A shares a subnet with Device B, and B is using an IP address/mask of 132.245.252.1/26, then Device A should have a similar address and mask. If Device B is running RIP to communicate routing information on this interface, then Device A should run RIP as well. This concept underlies the intelligent decision making within the Autoconfig process.

For each protocol configurable by Autoconfig, Autoconfig must decide (a) whether to enable the protocol on the local device, and (b) what parameters should be used. Generally, if another device on a particular subnet is using a protocol, then Autoconfig suggests enabling that protocol on the local device. The following enumeration summarizes the protocols configurable by Autoconfig and the parameters that it suggests for them. This protocol list is easily extendible.

RIP. RIP version number may be determined. No additional parameters are suggested for RIP beyond enabling RIP on a particular subnet.

OSPF. In addition to determining whether OSPF should be enabled, Autoconfig also determines the OSPF area, router dead interval, and hello timer values. These parameters are chosen to match the analogous parameters on other routers sharing the subnet.

VRRP. In addition to deciding whether VRRP should be enabled, Autoconfig determines the VR IP address, the VR identifier, the advertisement interval, and the priority values. All values except priority are chosen to match those of other routers sharing the subnet. The priority is chosen as follows. If the VR IP address is the local router's IP address, then the priority is 255. If there are other backups for the VR, then the priority is selected to match that of the other backups. Otherwise, the suggested priority is 254.

DHCP. In addition to deciding whether DHCP Relay functions should be enabled, Autoconfig suggests a DHCP server address and a mode (DHCP, BOOTP, or DHCP/BOOTP). These parameters are suggested to match those of other DHCP Relay agents on the subnet. (It may be beneficial to limit the number of BOOTP Relay Agents on a particular subnet. Each relay agent forwards traffic to a DHCP server. Multiple relay agents provide redundancy, but at the cost of extra processing and bandwidth. It may be worthwhile to limit the number of relay agents on a particular subnet to some maximum value, say 3).

STP. No additional parameters are suggested for Spanning Tree beyond enabling it on a particular port.

MLT. Autoconfig recommends creating a MLT on a set of ports when that set of ports is receiving identical BPDUs from another switch. Identical BPDUs are characterized by having the same source MAC address and Bridge Identifier. An identifier is suggested to make the MLT identifier unique on the local device.

Autoconfig must also make decisions that are not protocol specific. These additional decisions include, but are not limited to, the following list.

IP mask determination. Autoconfig must determine the mask to use for a particular subnet. This algorithm is based on the empirical evidence that router addresses are almost always chosen near the top or bottom of a subnet range. Basically, the algorithm looks at the IP addresses of other routers in the system and guesses a mask that puts these routers at the top or bottom of the subnet. When possible, Autoconfig tries to use the subnet mask as learned from OSPF packets or from the Autoconfig ICMP RA extensions. Heuristics are used only if the mask is not known by these other means.

IP address selection. Autoconfig must also determine an IP address for the local device. Given the mask and the addresses of other routers, the algorithm to select an IP address works as follows. First, it determines whether there is a preference for numbering IP addresses at the top or bottom of the subnet range. Then, starting at the preferred end, the algorithm looks for the first unused address. Addresses are tested for use by issuing an ARP for the address. If the ARP is not answered (after a suitable number of retries), the address is assumed free and is chosen for the local device. IP mask determination and IP address selection are discussed in greater detail in co-pending U.S. patent application entitled "SYSTEM, DEVICE, AND METHOD FOR DETERMINING A NETWORK ADDRESS AND SUBNET MASK FOR A NET- WORK DEVICE IN A COMMUNICATION NETWORK", filed on even date herewith and incorporated herein by reference.

VLAN or port decision. When creating a subnet on a VLAN capable device, one must decide whether that subnet should have a port or a VLAN as an interface. In general, a port is more efficient, but a VLAN is a safer alternative.

Autoconfig makes this decision as follows. First, the ports that have detected control packets from other routers on this subnet are identified. It is suggested to create a VLAN for the subnet unless all of the following conditions are met:

- This subnet is not known to be associated with a VLAN (for example, the packets are not 801.D VLAN encapsulated).
- Only a single port has heard packets for this subnet (a VLAN is required for more than one port).
- The potential port for the subnet is not in any non-default VLAN (Autoconfig should not remove any port/VLAN associations except the default).
- The potential port for the subnet does not already have the maximum number of IP addresses assigned to it (so it can support the assignment of another subnet).

Default route determination. Routers may have an explicit static default route configured. To determine whether the local router should have a static default route, Autoconfig looks at the static default routes of other routers. If another router has a static default route on the subnet, then Autoconfig suggests using the same default route for the local device. Otherwise, if another router has a static default route not on a shared subnet, then Autoconfig suggests using that other router as the default route. If neither of these conditions is met, then Autoconfig suggests not using a static default route.

VLAN/STG association. VLANs must be associated with a Spanning Tree Group. Autoconfig attempts to match the VLAN/STG association with that of its neighbors. If this fails, it suggests associating any new VLANs with the default STG.

The preceding discussion described how a preferred embodiment of Autoconfig uses the configuration of other routers to determine its own configuration. This concept can be easily extended to additional features and protocols in the future. The next portion of the discussion describes how these decisions can be organized and presented so that the device can be configured in an understandable manner.

There are two approaches to instantiating the choices made in the Autoconfig process. The first approach is self-configuration. A device must be able to boot, gather information, and use this collected data to configure itself. The second approach is to provide a guided configuration that uses the same decision making abilities as the automated configuration, but that allows users to oversee and overrule these decisions. In many environments, a device that self-configures will not be permitted. Many administrators want to know how each box is configured. For this reason, the ability to walk an administrator through the decision process, providing some justification for the configuration recommendations, is seen to be as important as automatic configuration.

Guided configuration utilities have been provided on some devices in the past. Autoconfig guided configuration differs in its ability to provide better default answers. For example, other guided configuration utilities require the user to input all data (IP addresses, masks, OSPF areas, etc.). These utilities do not draw upon a network database to provide more appropriate values for configuration parameters. With Autoconfig, default values are chosen based on the state of the attached networks. An administrator should be able to go through the guided Autoconfig process, hitting 'enter' to accept the Autoconfig default for each parameter. The process should justify why certain parameters are suggested so that the user is informed of the decision process and is more comfortable in accepting the decisions. The protocols that can be configured by Autoconfig in one embodiment are: RIP, OSPF, DHCP, VRRP, STP, and MLT, although other embodiments may be able to configure other protocols. This embodiment supports port-based, subnet-based, and protocol-based VLANs. The embodiment also supports only a single IF address on each port.

A preferred embodiment of Autoconfig is designed as a portable software module. As shown in FIG. 1, the configuration determination module 16 and the autoconfiguration module 17 are tightly integrated to form the "core" of the Autoconfig utility, which in turn, communicates with the network 12 by means of a data interface driver 14. The details of these modules are described in more detail in the following sections.

The "core" component, where the majority of the Autoconfig process sits, includes the files acfg.h acfgUI.h acfg.c acfgBasic.h acfgConfig.h acfgDatabases.h acfgDatabases.c which will be described below. The structures and procedures within this component are preferably system independent. File acfgUI.h defines an interface into the Autoconfig process. These are the functions intended to be called by other parts of the system to interact with Autoconfig. All functions defined in this file are externally safe (i.e., the functions grab the appropriate locks before gaining access). These functions can be generally categorized as follows:

- Control the Autoconfig process (start, stop, create, delete, set parameters, etc.)
- Status and config reports (port 3/1 now active, etc.)
- Event notification (detected a neighboring router, etc.)
- Configuration suggestions (should enable OSPF on this interface, etc.)

There are a great deal of other functions defined in acfg.c that support these functions (initializing/deleting control blocks, etc), and that are not externally safe. The file acfg.h defines types and structures that are internal to the Autoconfig process and that should not be exposed to other parts of the system.

The file acfgBasic.h defines some basic structures and primitives. These structures are system independent, but are made of system dependent types that are grouped together to form more complex structures.

File acfgConfig.h defines the configuration information used to guide the Autoconfig system. Currently there are a variety of configuration parameters guiding Autoconfig, but this level of control may not be necessary for other embodiments of Autoconfig, and hence most of these fields may have fixed values and their existence may not be exposed to users.

Database files acfgDatabase.h and acfgDatabase.c define the implementation and control of the back-end database used by Autoconfig. This database contains configuration data on other routers and switches. The database is implemented in a preferred embodiment as a linked list. In most environments, it is expected that the population of the database will remain small, so the database implementation has not been chosen to optimize query performance. If performance becomes an issue, the database could be implemented with data structures that provide more efficient lookups (i.e. hash tables or trees).

Files acfgPrimitives.h acfgLock.c acfgTimer.c acfgSystemIntf.h acfgSystemIntf.c, The Autoconfig process needs information from the system, and it needs some basic system utilities and functions such as timers, lists, semaphores, etc. This component is the collection of these basic system requirements and utilities. The interface into these functions are system independent, but the implementation of the interface is system dependent.

File acfgPrimitives.h is the lowest level include file for the Autoconfig process. This file defines the most basic necessities of the Autoconfig system. Many simple structures and their interfaces are defined. Where possible, definitions are mapped into definitions already existing in the system (for example, we don't want to create a new type of mutual exclusion lock, just use the one that already exists). The file includes the definitions of the following basic primitives:

Simple types. Including integers, unsigned integers, booleans, etc.

Port identifiers and masks. How to represent individual and sets of ports.

VLAN types and protocols. Definitions related to VLANs such as VLAN types, protocols, etc.

Timers. Primitives for creating and using timers.

Locks. Primitives for creating mutual exclusion locks.

System capabilities. Primitives to determine if the system can run OSPF, use VLANs, etc.

For the most part, the definitions and requirements of acfgPrimitives.h are mapped directly into existing system functions. However, the files acfgTimer.c and acfgLock.c are required to map the Autoconfig requirements of timers and mutual exclusion locks into the existing system abilities on a preferred embodiment. Within this component are the definitions of the basic structures required for Autoconfig. These definitions are system dependent. For example, the definitions of mutual exclusion locks and timers are in this component. These are system dependent because timers and locks change with the underlying system. The system interface files (acfgSystemIntf.h, acfgSystemIntf.c) define procedures needed by the core module to access data in the rest of the system. These procedures access system data and return it to the Autoconfig module using data structures defined within the Autoconfig module. The functions in this module must take care to obtain the proper locks before accessing variables defined elsewhere.

Files acfgUIGlue.h acfgUIGlue.c As previously mentioned, file acfgUI.h defines an interface into the core module. This interface is designed to be system independent. For any particular system to use this interface, however, usually requires some "glue" around the interface functions to match the interface that the system expects. Files acfgUIGlue.h and acfgUIGlue.c provide this glue. These files define enhancements and extensions to the functions declared in acfgUI.h so that the functions provided better match the needs of the system.

Files acfgComm.h acfgComm.c acfgServerComm.h acfgServerComm.c acfgConsoleComm.h acfgConsoleComm.c acfgCli.h acfgCli.c acfgMgmt.h acfgMgmt.g Files acfgCli.c and acfgCli.h define and implement the functions called from the Autoconfig CLI commands. These are functions such as "show" and "config". It may be useful for a user to be able to "show" the elements in the database, or to "clear" the database. But, a preferred embodiment may not need for any particular "config" commands for the Autoconfig module itself. Files acfgMgmt.h and acfgMgmt.c are the interface from the SNMP module. As previously mentioned, Autoconfig defines a Management Information base (MIB) so that a management station may issue SNMP sets to inform Autoconfig about the configuration of neighboring devices. These files implement the back-end to that MIB. Files acfgServerComm.h and acfgServerComm.c define the system and functions for communicating with a management station. These files contain the procedures for processing and transmitting packets to a management station, as well as for registering with the system to receive these packets. The console communications files (acfgConsoleComm.h, acfgConsoleComm.c) control communications with the console. In particular, these files contain the "autoconfigure" functions that get called to run the main Autoconfig utility. These files contain the procedures for processing input and sending output to the system console and event log. Finally, the acfgComm.h and acfgComm.c files act as a front end to the previous communications files. In particular, these files define many functions (such as "start", "stop", etc) that basically call analogous functions in each of acfgConsoleComm and acfgServerComm. In general, these files are just a way to control the previous files with a single command set.

As previously described, a preferred embodiment of Autoconfig builds its database based on both passive and active methods. For passive learning, the Autoconfig module needs to snoop on certain control frames so that configuration data on neighboring routers can be detected. To ensure that the proper frames get passed to the CPU, Autoconfig calls two functions: acfgRegisterForLearning and acfgRegisterPortForLearning. The former function performs any global changes required to ensure that Autoconfig can snoop the proper frames. The latter function is called for each port over which Autoconfig is attempting to snoop.

The protocols that are snooped are generally "chatty", i.e. they use broadcasts or multicasts to send periodic messages to other devices running the same protocol. With Autoconfig, these protocol messages are received when the protocol is disabled, and are passed to the CPU so that they can be inspected. To accomplish this, the appropriate MAC addresses are registered on all ports, regardless of the protocol state. Before Autoconfig, the various MAC addresses were registered (and sometimes unregistered) when particular protocols were activated over various ports. Now, these MAC addresses are registered for on every port and every VLAN, regardless of the protocol state on that port or VLAN. When a VLAN is created, the appropriate MAC addresses are registered for on all of its ports. The enabling or disabling of a protocol does not effect the MAC address registration on the individual ports. These changes are enacted in vlan.c and rcip-cfg.c. This causes the reception of more packets into the CPU. When the protocols are disabled, the packets are discarded appropriately by the higher layers. Since these control protocols require little multicast bandwidth, this change should have little effect on CPU performance.

Autoconfig learns more if it snoops packets before they get discarded due to blocked spanning tree ports. Hence, the snooping occurs very low in the protocol stack. Snooping hooks have been placed in the file cpp.c in the function cppRxTask, before the spanning tree checks. A macro has been placed in this function that checks for control frames. If a relevant control frame is found, a function is called that parses the frame enough to extract pertinent data. The macro performs only enough parsing to decide if a frame is relevant to Autoconfig. The performance impacts have not been measured, but are expected to be small.

Autoconfig uses two types of active learning. First, it includes extensions in ICMP Router Advertisements (RAs) that contain additional configuration data about the device. Second, it maintains a MIB so that a management station may issue SNMP sets to its database, providing configuration data on nearby routers.

Certain information is relatively un-snoop-able. For example, whether a particular subnet is configured as an "IP subnet" VLAN or a "port-based" VLAN is undetectable based on the data flows in and out of other devices. For this reason, Autoconfig periodically transmits ICMP Router Advertisements that contain extensions specifically to advertise this non-detectable information. The Router Advertisements are transmitted roughly every 45 seconds over each routable interface, and are addressed to the all-routers IP address (Normal ICMP RAs are sent to the all-hosts IP address. Since the information in these messages is intended for other routers, the destination is changed as well. Also, many routers by default don't process packets to the "all hosts" address, but they do process packets to the "all routers" address. Hence the destination change). The additional information included in the Router Advertisements is (a) the VLAN tag associated with the subnet, (b) the type of VLAN (port-based or IP subnet), (c) the subnet mask, (d) the associated STG, (e) the DHCP server address and DHCP forwarding mode (if the interface is a DHCP Relay Agent), and (f) a static default route (if the router is using a static default route). The Autoconfig module must also receive and process ICMP Router Advertisements and parse these extensions when present. To support the reception of unknown VLAN tags, the CpUnknownTagToCpu flag is set to TRUE for Autoconfig ports in a preferred embodiment. This is accomplished in the file vlan.c.

In order to support the possibility of a management station providing additional data to Autoconfig, a MIB is supported. The MIB can be used by any management station (e.g., Optivity, Topology Manager, etc.) to provide information to Autoconfig about neighboring routers. However, a management station like Optivity has no method to discover that a new router has been added to a network. In order to support Optivity-like management stations using SNMP to provide configuration data to Autoconfig, Autoconfig is able to send periodic UDP messages to a specific IP address and port. These messages contain a device identifier and a set of neighbors that have been detected by Autoconfig. Optivity could then search its database to find these neighboring devices, and provide Autoconfig with configuration data. The format of these messages is defined in acfgServerComm.h.

Information about neighboring devices may be discovered by snooping, by processing the Autoconfig extensions in ICMP Router Advertisements, or by a management station via SNMP. A preferred embodiment of Autoconfig maintains a single event queue by which this data is passed to the Autoconfig module. When new information is learned (via snooping, SNMP, etc), an event is placed on the Autoconfig queue. Autoconfig sweeps this queue once a second to process these events. The queue is a fixed size. When the queue is full, new events overwrite old events.

Autoconfig has four different types of events: IP neighbor events, Layer2 neighbor events, VLAN events, and MLT events. Each event type reports different information to the Autoconfig system. The event types and the relevant information reported to Autoconfig are defined in acfgUI.h. Autoconfig maintains a priority between different sources for events. An event may either be generated by management or by data. An event generated by management can overwrite information discovered by an event generated by "snooping", but not vice-versa. This prevents information learned from data packets from overwriting information learned from a management station, which is assumed to be a more reliable source. Each event is interpreted and the information is added to the Autoconfig database. Information learned via management ages at a slower pace than information learned from data. By default, information from management ages after an hour, while information from data packets ages after 5 minutes. The process that sweeps the database and removes expired entries runs relatively infrequently (every 30 seconds), so these aging times are not exact (and don't need to be).

Included in the interface to Autoconfig (acfgUI.h) are the Autoconfig "suggest" functions. These are the functions that use the database and attempt to make inferences about how the local device should be configured. The following suggestion functions are defined in a preferred embodiment:
    acfgSuggestNewSubnets
    acfgSuggestVlanTag acfgSuggestVlan acfgSuggestVlanPorts
    acfgSuggestRip acfgSuggestOspf acfgSuggestVrrp acfgSuggestDhcp acfgSuggestDefaultRoute
    acfgSuggestStg acfgSuggestMlt acfgSuggestMltId Almost all of the suggest functions have the same basic format. Given a "key", first determine if data on that key already exists in the local configuration, and if so, retrieve the relevant configuration data. Next, determine if there is any information in the Autoconfig database relevant to this key. If there is, overwrite the information so that the suggestion "matches" that of the neighboring router. An example will make this clearer.

For example, the function acfgSuggestOspf is based on the following pseudocode:

```
rc_t acfgSuggestOspf(ipAddrAndMask_t subnet, acfgOsfParms_t parms)
{
    acfgLockMain( )/*obtain lock on Autoconfig data*/
    /*fill in with default parms if can't find anything better
        later*/acfgDefaultOspfParms(parms);
    /*if subnet already exists on this device, get current parameters*/acfgCurrentOspfParms(subnet, parms);
    /*run through known IP neighbors on this subnet*/
    /*see if any are running OSPF*/
    for(nbr=acfgFirstIpNeighbor( ); nbr !=NULL;
        nbr=acfgNextIpNeighbor(nbr)) {
        if((on SameSubnet(nbr, sub)) &&(runningOspf(nbr))){
            matchParmsToThoseofNeighbor(parms, nbr);
        }
    }
    acfgUnlockMain( ); /*release lock on data structures*/
        return(SUCCESS);
}
```

The key for this function is an IP address and mask that is intended to define an IP interface on the local device. The suggested parameters are first filled in with defaults. The parameter set differs for each protocol or function, but for OSPF the parameters include whether OSPF is enabled on an interface, the area id, the router dead interval, and the hello timer. The default parameters usually disable the protocol in question. Next, the function determines if this subnet already exists on the local device. If so, then the current configuration parameters overwrite the default parameters. Finally, the function searches for a router on the same subnet that is running this protocol. If such a router is found, then this router's parameter set is copied into the suggested parameters.

Most suggestion functions follow the same format. However, a few of the suggest functions differ from that format. The changes are usually required because it is not easy to know when a neighboring device is running a particular protocol, or because the local configuration should not be exactly like that of the neighbor. As one example, when determining whether MLT should be configured on the local device, the suggest function searches for a neighboring switch (identified by its MAC address and BPDU bridge ID) that has been heard on multiple ports. This indicates that a single port on a neighboring device corresponds to multiple ports on this device, and that an MLT might be needed. As another example, when configuring VRRP, the priority of the local router should not necessarily match that of the neighboring router. Instead, Autoconfig chooses a priority such that (a) if the local IP address is the VR IP address, the suggested priority is 255, (b) if there is another backup router, the suggest priority matches that of the other backup router, or (c) the suggested priority is 254.

Thus, although many of the suggest functions are straightforward (if a neighbor is running protocol X with parameters Y, we should run protocol X with parameters Y), a few of the functions require some adjustments to make more appropriate configuration decisions. Each suggest function makes configuration suggestions for a limited parameter set. These individual parameter sets are combined in an automated process as described in the following section so that a more complete set of configuration parameters may be obtained.

The various suggest functions include calls to obtain current configuration parameters relevant to a particular subnet or ULAN. In general, Autoconfig implements these functions by searching the appropriate records or control blocks for the information. Before searching the records, Autoconfig obtains the appropriate locks (via rcIpLock, vlanLock, etc.). A preferred embodiment of Autoconfig does not use the SNMP interface defined by many modules.

Configuration parameters in a prior art system are typically set one parameter at a time via a command line or graphical user interface. In addition, console interfaces are arranged in a directory based menu structure and require users to set many items in a certain order. A preferred embodiment of the Autoconfig utility provides an interface that permits a user to bypass the normal configuration methods for many basic functions. First, Autoconfig provides a mechanism by which configuration parameters are prompted for. This contrasts with the standard mechanism in which users must type commands that define the parameters that also must be entered. Autoconfig can walk an administrator through the configuration of the device, prompting for the parameters and providing information about their meaning. Second, Autoconfig uses its database and infers answers to the prompts displayed to the administrator. The administrator can just hit 'enter' to accept the configuration parameter suggested by Autoconfig. Third, Autoconfig can perform this process without administrative oversight. The results of this process are the same as if the administrator had hit 'enter' to every Autoconfig prompt.

This automation is accomplished in the acfgConsoleComm files via the function acfgConsoleCommAutoconfigure. This function first makes a suggestion for the set of routable interfaces that should be configured on the local device. This set of interfaces is selected to cover the set of neighboring routers that have been detected. For each suggested new routable interface, acfgConsoleCommAutoconfigureSubnet is called. After this function is run for every suggested new subnet, the user is given an opportunity to configure subnets that have not been suggested by Autoconfig. The function acfgConsoleCommAutoconfigureSubnet calls the suggest functions as previously described to determine a suggested configuration for each routable interface. Once this parameter set is collected, the function acfgCreateRoutableIntf is called to actually implement the accepted configuration.

One of the inputs to the autoconfigure functions is a flags parameter that controls (a) whether user input is required, (b) whether output goes to the console, and (c) whether output goes to the event log. When user input is not required, the autoconfigure functions configure the device without administrative oversight. In such situations, having a record of the configuration decisions is of the utmost importance. Hence, the output of the process is recorded in the event log. The output is also sent to the console if the user initiates the autoconfigure functions via the command line (versus having the functions called automatically after a reboot).

The autoconfigure commands may be invoked via the command line, or they may happen automatically depending upon the setting of a boot parameter. There is an Autoconfig boot flag that determines whether the device should attempt autoconfiguration after booting. If set, the device attempts to configure itself two minutes after booting. The two minute delay permits the device populate its database. From the command line, the administrator may invoke either "guided" Autoconfig or "automatic" Autoconfig. The former requires user input while the latter makes all configuration decisions without user intervention. When invoked from the command line, output goes to both the console and the event log.

The Autoconfig I/O attempts to justify each configuration recommendation. An excerpt from the current I/O script is included below.

Accelar-1100#
Accelar-1100# autoconfig
This device has the following routable interfaces:
Subnet 1.1.1.1/255.255.255.0
    Ports: 2/1-2/2, 3/1-3/8, 3/13-3/14
Subnet 2.2.2.2/255.255.255.0
    Ports: 3/15
Subnet 9.9.9.1/255.255.255.128
    Ports: 3/9-3/10
Subnet 132.245.252.2/255.255.255.0
    Ports:
The following new routable interfaces are suggested:
Subnet 3.3.3.0/255.255.255.128 (3.3.3.2)
    Ports: 3/5-3/6
Would you like to add a subnet for neighbor 3.3.3.2 [yes]:
Enter address mask for this subnet [255.255.255.128]:
Enter IP address for this subnet [3.3.3.1]:
Autoconfiguring subnet 3.3.3.1/255.255.255.128
Neighbor 3.3.3.2 is running RIP. Suggest enabling RIP here.
Enable RIP [enable]:
Neighbor 3.3.3.2 is running OSPF. Suggest enabling OSPF here.
Enable OSPF [enable]:
Neighbor 3.3.3.2 is using OSPF Area 3.3.3.3.
Enter OSPF area [3.3.3.3]:
Neighbor 3.3.3.2 is using Hello Interval 10 s.
Enter Hello Interval [10]:
Neighbor 3.3.3.2 is using Router Dead Interval 60 s.
Enter Router Dead Interval [60]:
Neighbor 3.3.3.2 is running BOOTP/DHCP forwarding.
Suggest enabling BOOTP/DHCP forwarding here.
Enable DHCP/BOOTP forwarding [enable]:
Neighbor 3.3.3.2 is using DHCP server 5.5.5.3.
Enter DHCP server [5.5.5.3]:
Neighbor 3.3.3.2 is using BOOTP/DHCP forwarding mode bootp_dhcp.
Enter BOOTP/DHCP forwarding mode{2=bootp, 3=dhcp, 4=bootp_dhcp} [4]:
Neighbors have no default router on this subnet
Suggest not configuring the default route on this subnet
Enter next hop for default route (if on this subnet) [0.0.0.0]:
No neighbors for this subnet known to be using VLANs.

However, current config warrants a VLAN for this subnet.
Suggest creating a VLAN for this subnet.
Create VLAN for this subnet [yes]:
Creating VLAN for subnet . . . .
Enter VLAN identifier/tag [2]:
Using VLAN identifier/tag 2
Enter VLAN type [byport]:
VLAN 2 of type byport
When using 802.1D VLAN encapsulation, the BPDU VLAN tag is 4000 plus the spanning tree group identifier.
You may enter either the identifier (1-25) or the tag (4001-4025).
Enter spanning tree group identifier/tag [4001]:
Using spanning tree group BPDU IEEE tag 4001
This subnet has been heard/configured on the following ports: 3/5-3/6
Enter ports for VLAN [3/5-3/6]:
Enable spanning tree on bridge [enable]:
Spanning tree enabled
Adding routable interface to ports 3/5-3/6
Created new interface for 3.3.3.1/255.255.255.128.

Note that before the suggestion to enable a particular feature, the process justifies this decision by printing that some other router is running this protocol.

The function acfgCreateRoutableIntf is called to implement the configuration decisions of Autoconfig. This function uses the command line interface to actually enact the configuration changes. Configuration changes are transformed into commands (i.e. strings) which are fed into the system via the parse_line function. This function treats the command as if it came from a user. In fact, Autoconfig is implemented as a special type of CLI similar to the special CLI for the Device Manager. Changes were required to the file cli.c (in the cli module) to treat Autoconfig as a special type of CLI. When implementing configuration changes, Autoconfig assumes that the user does not want to get rid of things that have already been configured.

To this end, Autoconfig performs some additional processing in addition to the simple commands. When a new VLAN includes a port that is already in a non-default VLAN, Autoconfig automatically changes this port into a trunk port and puts it in both VLANs. A similar methodology is followed when a port must go in two STGs. When a routable port is also assigned to a new VLAN, the old routable port is changed into a VLAN with a single port, the port is turned into a trunk port, and the port is put in both the single port VLAN and the new VLAN. A few other enhancements along similar lines may be required to ensure that Autoconfig does not remove configuration previously added by the user.

In a preferred embodiment, the snooping processes of Autoconfig run all of the time on every port. This permits an administrator to run the autoconfigure utilities at any point in time. The automatic configuration aspects of Autoconfig are controlled by a boot flag that determines whether automatic configuration should occur or not. Autoconfig delays two minutes after booting before attempting the automatic configuration.

Preferred embodiments of the invention, or portions thereof (e.g., the configuration determination module 16, the autoconfiguration module 17, the data interface driver 14, etc.), may be implemented in any conventional computer programming language. For example, preferred embodiments may be implemented in a procedural programming language (e.g., "C") or an object oriented programming language (e.g., "C++" or "JAVA"). Alternative embodiments of the invention may be implemented as preprogrammed hardware elements (e.g., application specific integrated circuits), or other related components.

Alternative embodiments of the invention may be implemented as a computer program product for use with a computer system. Such implementation may include a series of computer instructions fixed either on a tangible medium, such as a computer readable media (e.g., a diskette, CD-ROM, ROM, or fixed disk), or transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions preferably embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

Although various exemplary embodiments of the invention have been disclosed, it should be apparent to those skilled in the art that various changes and modifications can be made that will achieve some of the advantages of the invention without departing from the true scope of the invention. These and other obvious modifications are intended to be covered by the appended claims.

What is claimed is:

1. A method of configuring a first network device for connection to a communications network subnet having a second network device, the method comprising: determining, with a configuration determination module of the first network device, configuration attributes for operably connecting the first network device to the subnet based on configuration information for the subnet detected by the first network device, wherein at least a portion of the configuration information is detected by passively listening to control traffic and at least a portion of the configuration information is detected by direct communication with another network device; and configuring the first network device, with an auto configuration module of the first network device, according to the configuration attributes so that the first network device is operably connected to the subnet; and wherein the configuration attributes comprise an Internet Protocol (IP) subnet mask determined based upon the configuration information unique to the subnet and derived from passively listening to control traffic detected by the first network device at interfaces between the first network device and the subnet, and at least a one of Spanning Tree Group information,
  Simple Network Management Protocol (SNMP) server addresses, Open Shortest Path First (OSPF) timer information, Routing Information Protocol (RIP) broadcast timer information, and Virtual Router Redundancy Protocol (VRRP) information.

2. A method according to claim 1, wherein configuring the first network device is performed automatically by the autoconfiguration module.

3. A method according to claim 1, wherein configuring the first network device is performed as a guided process in which the autoconfiguration module interacts with a user and presents to the user suggested configuration choices based on the configuration attributes.

4. A method according to claim 3, wherein the suggested configuration choices are accompanied by an explanation to the user as to why the configuration choices have been suggested.

5. A method according to claim 1, wherein the configuration attributes comprise at least one of Dynamic Host Configuration Protocol (DHCP) forwarding data and DHCP server address.

6. A method according to claim 1, wherein the configuration attributes comprise virtual local area network (VLAN) information including tag identifications, types, protocols, addresses, and port-to-VLAN mappings.

7. A method according to claim 1, wherein determining configuration attributes further comprises communicating with a network centralized configuration server.

8. A method according to claim 7, wherein the network centralized configuration server uses Simple Network Management Protocol (SNMP) to communicate.

9. A method according to claim 7, wherein communicating with a network centralized configuration server comprises:
sending to the centralized configuration server a message containing the addresses of network neighbors on the subnet;
searching in a configuration database of the centralized configuration server for configuration attributes relevant to the first network device; and
forwarding the configuration attributes from the configuration database to the first network device.

10. A method according to claim 1, wherein determining configuration attributes further comprises communicating with the second network device.

11. A method according to claim 10, wherein communicating with the second network device uses a protocol based on Internet Control Message Protocol (ICMP) or User Datagram Protocol (UDP).

12. A method according to claim 1, wherein determining configuration attributes comprises analyzing routing protocol control packets detected by the first network device.

13. An auto configuring data router connected to a communications network subnet having a second network data router, the auto configuring data router comprising: a configuration determination module that determines configuration attributes for operably connecting the auto configuring data router to the subnet based on configuration information for the subnet detected by the auto configuring data router, wherein at least a portion
of the configuration information is detected by passively listening to control traffic and at least a portion of the configuration information is detected by direct communication with another network device; and an auto configuration module that configures the auto configuring data router according to the configuration attributes so that the auto configuring data router is operably connected to the
subnet; and wherein the configuration attributes comprise an Internet Protocol (IP) subnet mask determined based upon the configuration information unique to the subnet and derived from passively listening to control traffic detected by the first network device at interfaces between the first network device and the subnet, and at least a one of Spanning Tree Group information, Simple Network Management Protocol (SNMP) server addresses, Open Shortest Path First
(OSPF) timer information, Routing Information Protocol (RIP) broadcast timer information, and Virtual Router Redundancy Protocol (VRRP) information.

14. An autoconfiguring data router according to claim 13, wherein the autoconfiguration module configures the autoconfiguring data router automatically.

15. An autoconfiguring data router according to claim 13 wherein the autoconfiguration module configures the autoconfiguring data router using a guided process in which the autoconfiguration module interacts with a user and presents to the user suggested configuration choices based on the configuration attributes.

16. An autoconfiguring data router according to claim 15, wherein the autoconfiguration module accompanies the suggested configuration choices with an explanation to the user as to why the configuration choices have been suggested.

17. An autoconfiguring data router according to claim 13, wherein the configuration attributes comprise at least one of Dynamic Host Configuration Protocol (DHCP) forwarding data and DHCP server address.

18. An autoconfiguring data router according to claim 13, wherein the configuration attributes comprise virtual local area network (VLAN) information including tag identifications, types, protocols, addresses, and port-to-VLAN mappings.

19. An autoconfiguring data router according to claim 13, wherein the configuration determination module communicates with a network centralized configuration server to determine configuration attributes.

20. An autoconfiguring data router according to claim 19, wherein the network centralized configuration server uses Simple Network Management Protocol (SNMP) to communicate with the configuration determination module.

21. An autoconfiguring data router according to claim 13, wherein the configuration determination module communicates with a second network data router to determine configuration attributes.

22. An autoconfiguring data router according to claim 21, wherein the configuration determination module uses a protocol based on Internet Control Message Protocol (ICMP) or User Datagram Protocol (UDP) to communicate with the second network data router.

23. An autoconfiguring data router according to claim 13, wherein the configuration determination module analyzes routing protocol control packets detected by the autoconfiguring data router to determine configuration attributes.

24. A computer network having at least one subnet work, the at least one subnet work having a plurality of data routers that communicate data packets over the network, the subnet work including at least one auto configuring data router, the at least one auto configuring data router comprising:
a configuration determination module that determines configuration attributes for
operably connecting the auto configuring data router to the subnet based on configuration information for the subnet detected by the auto configuring data router, wherein at least a portion of the configuration information is detected by passively listening to control traffic and at least a portion of the configuration information is detected by direct communication with another network device; and an auto configuration module that configures the auto configuring data router according to the configuration attributes so that the auto configuring data router is operably connected to the subnet; and wherein the configuration attributes comprise an Internet Protocol (IP) subnet mask determined based upon the configuration information unique to the subnet and derived from passively listening to control traffic detected by the first network device at interfaces between the first network device and the subnet, and at least a one of Spanning Tree Group information, Simple Network Management Protocol (SNMP) server addresses, Open Shortest Path First (OSPF) timer information, Routing Information Protocol (RIP) broadcast timer information, and Virtual Router Redundancy Protocol (VRRP) information.

25. A computer network according to claim 24, wherein the autoconfiguration module configures the autoconfiguring data router automatically.

26. A computer network according to claim 24, wherein the autoconfiguration module configures the autoconfiguring data router using a guided process in which the autoconfiguration module interacts with a user and presents to the user suggested configuration choices based on the configuration attributes.

27. A computer network according to claim 26, wherein the autoconfiguration module accompanies the suggested configuration choices with an explanation to the user as to why the configuration choices have been suggested.

28. A computer network according to claim 24, wherein the configuration attributes comprise at least one of Dynamic Host Configuration Protocol (DHCP) forwarding data and DHCP server address.

29. A computer network according to claim 24, wherein the configuration attributes comprise virtual local area network (VLAN) information including tag identifications, types, protocols, addresses, and port-to-VLAN mappings.

30. A computer network according to claim 24, wherein the configuration determination module communicates with a network centralized configuration server to determine configuration attributes.

31. A computer network according to claim 30, wherein the network centralized configuration server uses Simple Network Management Protocol (SNMP) to communicate with the configuration determination module.

32. A computer network according to claim 24, wherein the configuration determination module communicates with a second network data router to determine configuration attributes.

33. A computer network according to claim 32, wherein the configuration determination module uses a protocol based on Internet Control Message Protocol (ICMP) or User Datagram Protocol (UDP) to communicate with the second network data router.

34. A computer network according to claim 24, wherein the configuration determination module analyzes routing protocol control packets detected by the autoconfiguring data router to determine configuration attributes.

35. A computer program product for use on a computer system for configuring a first network device for connection to a communications network subnet having a second network device, the computer program product comprising a computer-usable medium having computer-readable program code thereon, the computer readable program code including: program code for determining configuration attributes for operably connecting the first network device to the subnet based on configuration information for the subnet detected by the first network device, wherein at least a portion of the configuration information is detected by passively listening to control traffic and at least a portion of the configuration information is detected by direct communication with another network device; and program code for configuring the first network device according to the configuration attributes so that the first network device is operably connected to the subnet; and wherein the configuration attributes comprise an Internet Protocol (IP) subnet mask determined based upon the configuration information unique to the subnet and derived from passively listening to control traffic detected by the first network device at interfaces between the first network device and the subnet, and at least a one of Spanning Tree Group information, Simple Network Management Protocol (SNMP) server addresses, Open Shortest Path First (OSPF) timer information, Routing Information Protocol (RIP) broadcast timer information, and Virtual Router Redundancy Protocol (VRRP) information.

36. A computer program product according to claim 35, wherein configuring the first network device is performed automatically by the autoconfiguration module.

37. A computer program product according to claim 35, wherein configuring the first network device is performed as a guided process in which the autoconfiguration module interacts with a user and presents to the user suggested configuration choices based on the configuration attributes.

38. A computer program product according to claim 37, wherein the suggested configuration choices are accompanied by an explanation to the user as to why the configuration choices have been suggested.

39. A computer program product according to claim 35, wherein the configuration attributes comprise at least one of Dynamic Host Configuration Protocol (DHCP) forwarding data and DHCP server address.

40. A computer program product according to claim 35, wherein the configuration attributes comprise virtual local area network (VLAN) information including tag identifications, types, protocols, addresses, and port-to-VLAN mappings.

41. A computer program product according to claim 35, wherein the program code for determining configuration attributes further comprises program code for communicating with a network centralized configuration server.

42. A computer program product according to claim 41, wherein the network centralized configuration server uses Simple Network Management Protocol (SNMP) to communicate.

43. A computer program product according to claim 41, wherein the program code for communicating with a network centralized configuration server comprises:
   program code for sending to the centralized configuration server a message containing the addresses of network neighbors on the subnet;
   program code for searching in a configuration database of the centralized configuration server for configuration attributes relevant to the first network device; and
   program code for forwarding the configuration attributes from the configuration database to the first network device.

44. A computer program product according to claim 35, wherein the program code for determining configuration attributes further comprises program code for communicating with the second network device.

45. A computer program product according to claim 44, wherein the program code for communicating with the second network device uses a protocol based on Internet Control Message Protocol (ICMP) or User Datagram Protocol (UDP).

46. A computer program product according to claim 35, wherein the program code for determining configuration attributes comprises program code for analyzing routing protocol control packets detected by the first network device.

47. An auto configuring data router connected to a communications network subnet having a second network data router, the auto configuring data router comprising: means for determining configuration attributes for operably connecting the auto configuring data router to the subnet based on configuration information for the subnet detected by the auto configuring data router, wherein at least a portion of the configuration information is detected by passively listening to control traffic and at least a portion of the configuration information is detected by direct communication with another network device; and means for configuring the auto configuring data router according to the configuration attributes so that the auto configuring data router is operably connected to the subnet; and wherein the configuration attributes comprise an Internet Protocol (IP) subnet mask determined based upon the configuration information unique to the subnet and derived from passively listening to control traffic detected by the first network device at interfaces between the first network device and the subnet, and at least a one of Spanning Tree Group information, Simple Network Management Protocol (SNMP) server addresses, Open Shortest Path First (OSPF) timer information, Routing Information Protocol (RIP) broadcast timer information, and Virtual Router Redundancy Protocol (VRRP) information.

48. An autoconfiguring data router according to claim 47, wherein the means for configuring the autoconfiguring data router operates automatically.

49. An autoconfiguring data router according to claim 47, wherein the means for configuring the autoconfiguring data router uses a guided process in which the means for configuring interacts with a user and presents to the user suggested configuration choices based on the configuration attributes.

50. An autoconfiguring data router according to claim 49, wherein the suggested configuration choices are accompanied by an explanation to the user as to why the configuration choices have been suggested.

51. An autoconfiguring data router according to claim 47, wherein the configuration attributes comprise at least one of Dynamic Host Configuration Protocol (DHCP) forwarding data and DHCP server address.

52. An autoconfiguring data router according to claim 47, wherein the configuration attributes comprise virtual local area network (VLAN) information including tag identifications, types, protocols, addresses, and port-to-VLAN mappings.

53. An autoconfiguring data router according to claim 47, wherein the means for determining configuration attributes further comprises means for communicating with a network centralized configuration server.

54. An autoconfiguring data router according to claim 53, wherein the network centralized configuration server uses Simple Network Management Protocol (SNMP) to communicate with the means for communicating.

55. An autoconfiguring data router according to claim 53, wherein the means for communicating with a network centralized configuration server comprises:

means for sending to the centralized configuration server a message containing the addresses of network neighbors on the subnet;

means for searching in a configuration database of the centralized configuration server for configuration attributes relevant to the autoconfiguring data router; and means for forwarding the configuration attributes from the configuration database to the autoconfiguring data router.

56. An autoconfiguring data router according to claim 47, wherein the means for determining configuration attributes further comprises means for communicating with the second network data router.

57. An autoconfiguring data router according to claim 56, wherein the means for communicating with the second network data router uses a protocol based on Internet Control Message Protocol (ICMP) or User Datagram Protocol (UDP).

58. An autoconfiguring data router according to claim 47, wherein the means for determining configuration attributes further comprises means for analyzing routing protocol control packets detected by the autoconfiguring data router.

* * * * *